US006955076B1

United States Patent
Widt et al.

(10) Patent No.: US 6,955,076 B1
(45) Date of Patent: Oct. 18, 2005

(54) FOIL LEAK DETECTION CHAMBER

(75) Inventors: Rudi Widt, Cologne (DE); Thomas Abelen, Cologne (DE)

(73) Assignee: Leybold Vakuum GmbH, Cologne (DE)

( * ) Notice: Subject to any disclaimer, the term of this patent is extended or adjusted under 35 U.S.C. 154(b) by 0 days.

(21) Appl. No.: 10/031,876

(22) PCT Filed: Jul. 6, 2000

(86) PCT No.: PCT/EP00/06390

§ 371 (c)(1),
(2), (4) Date: Jan. 24, 2002

(87) PCT Pub. No.: WO01/07887

PCT Pub. Date: Feb. 1, 2001

(30) Foreign Application Priority Data

Jul. 27, 1999 (DE) ................. 199 35 293

(51) Int. Cl.[7] ............ G01M 3/22; G01M 3/32
(52) U.S. Cl. ............ 73/49.3; 73/40.7; 73/46; 73/49.2
(58) Field of Search ................. 73/40–49.8

(56) References Cited

U.S. PATENT DOCUMENTS

| | | | | |
|---|---|---|---|---|
| 3,027,753 A | * | 4/1962 | Harder, Jr. | 73/40.7 |
| 3,813,923 A | * | 6/1974 | Pendleton | 73/49.2 |
| 3,864,960 A | * | 2/1975 | Fletcher et al. | 73/46 |
| 3,884,818 A | * | 5/1975 | Tomita et al. | 378/187 |
| 4,055,984 A | * | 11/1977 | Marx | 73/40.7 |
| 4,584,877 A | * | 4/1986 | Brayman | 73/40.7 |
| 4,593,554 A | * | 6/1986 | Aarts | 73/49.3 |
| 4,774,830 A | * | 10/1988 | Hulsman | 73/49.3 |
| 4,934,180 A | * | 6/1990 | Hulsman | 73/49.3 |
| 5,068,074 A | * | 11/1991 | De Rego | 264/257 |
| 5,111,684 A | * | 5/1992 | Stauffer et al. | 73/49.3 |
| 5,172,583 A | * | 12/1992 | Tallon | 73/40.7 |
| 5,182,076 A | * | 1/1993 | de Seroux et al. | 376/250 |
| 5,199,296 A | * | 4/1993 | Lehmann | 73/49.3 |
| 5,373,729 A | * | 12/1994 | Seigeot | 73/49.3 |
| 5,513,516 A | * | 5/1996 | Stauffer | 73/49.2 |
| 5,894,225 A | | 4/1999 | Coffin | 324/762 |
| 6,279,382 B1 | * | 8/2001 | Yatagai | 73/37 |

(Continued)

FOREIGN PATENT DOCUMENTS

DE 23 48 319 4/1975

(Continued)

OTHER PUBLICATIONS

"Introduction to Helium Mass Spectrometer Leak Detection", Varian Associates, Inc., 1980, pp. 46-63.*

(Continued)

*Primary Examiner*—Hezron Williams
*Assistant Examiner*—David A. Rogers
(74) *Attorney, Agent, or Firm*—Wall, Marjama & Bilinski LLP

(57) ABSTRACT

The invention relates to a chamber for the detection of leaks on foils (1). Said chamber comprises two frames (2, 3) which are connected together in an articulated manner, foils (4, 5) which are mounted on said frames, a test chamber (8) composed of the foils, a seal (12, 13, 18) arranged between the frames and at least one bore hole (7), preferably several bore holes, in at least one of the two frames (2, 3), which can be connected to the inlet of a vacuum pump (15, 16, 22). In order to improve the chamber's closing features, said chamber comprises an edge zone (14) wherein a vacuum can be created independently of the test chamber (8) and into which said bore holes (7) open out.

11 Claims, 1 Drawing Sheet

Figure 1:
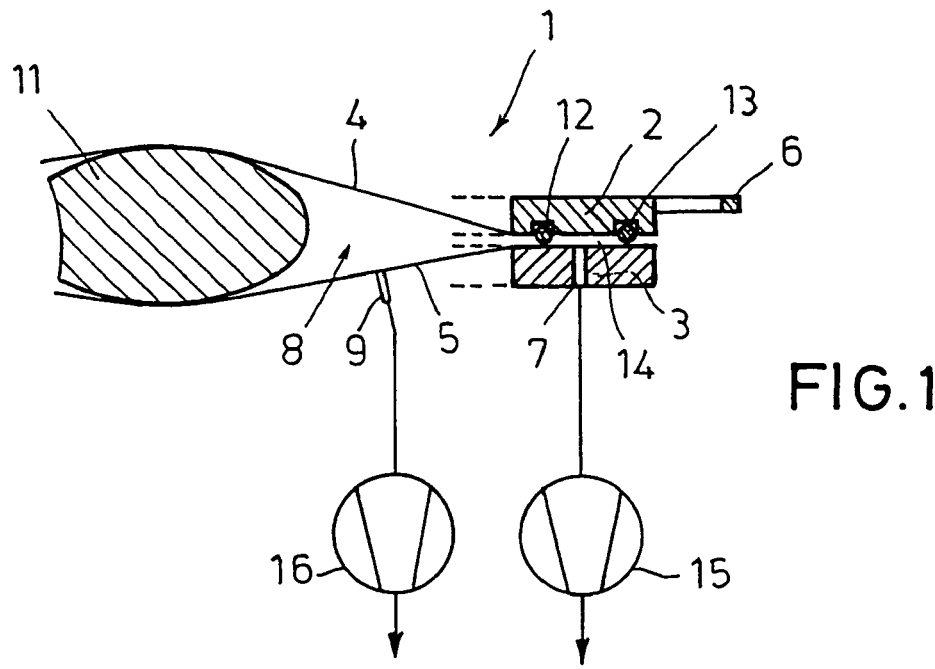

U.S. PATENT DOCUMENTS 6,321,589 B1 * 11/2001 Regimand .................... 73/32 R
6,354,142 B1 *  3/2002 Nothhelfer et al. .......... 73/49.3

FOREIGN PATENT DOCUMENTS

| DE | 196 42 099 A1 | 4/1998 | .......... G01N 03/82 |
| DE | 197 21 845 | 12/1998 | .......... G01N 03/08 |
| FR | 20 26 950 | 9/1970 | .......... G01M 3/00 |
| JP | 54158346 A * | 12/1979 | .......... B23K 31/00 |
| JP | 56161539 A * | 12/1981 | ............ G03C 1/74 |
| JP | 63215932 A * | 9/1988 | ........... G01M 3/04 |
| JP | 11156896 A * | 6/1999 | ........... B29C 45/34 |

OTHER PUBLICATIONS

JP 2-40522 A., In: Patents Abstracts of Japan, P-1040, Apr. 23, 1990, vol. 14, No. 199.

* cited by examiner

FOIL LEAK DETECTION CHAMBER

Foil leak detection chamber comprising two frames which are connected together in an articulated manner, foils which are mounted on said frames, a test chamber composed of the foils, a seal arranged between the frames and at least one bore hole, preferably several bore holes, in at least one of the two frames which can be connected to the inlet of a vacuum pump.

A foil leak detection chamber of this kind is known from DE-A-196 42 099. It is a component of a leak detection instrument which is equipped with the usual means (vacuum pumps, test gas sensor, controlling means etc.).

In the instance of the foil leak detection instruments of the kind affected here, the two frames are positioned substantially in the horizontal plane. The upper frame is equipped on the side opposing the articulation with a handle.

In order to open the test chamber created by the foils, the upper frame is lifted. A test sample which is to be inspected for the presence of leaks is then placed on the bottom foil. The test chamber is closed by lowering the upper frame to such an extent that the seal located between the frames ensures a vacuum-tight seal of the chamber.

Generally, the test samples will exhibit a volume necessitating more or less an expansion of the foils. For this, a force needs to be exerted opposing the lowering motion of the upper frame and which is only compensated when a sufficiently low pressure has been attained in the test chamber. Until this low pressure has been attained, the person operating the foil leak detection instrument needs to hold the upper frame. This time span is fairly long since the elastic walls of the test chamber give way initially, and because a low pressure of any significance is only created after the foils have made contact with the test sample, and the still remaining free volume has substantially attained its smallest volume.

In the instance of larger foil leak detection instruments of the kind affected here it is known to equip these with a spring, the force of which also opposes the closing motion of the upper frame. The presence of this spring is intended either for automatic opening of the upper frame during venting or at least for supporting the at that time the necessary opening motion. Owing to this second force opposing the closing motion, the time needed to hold the upper frame until the test chamber has been securely sealed, will be even longer.

It is the task of the present invention to improve the closing characteristics of a foil leak detection chamber of the kind affected here.

This task is solved through the characteristic features of the patent claims.

In that an edge zone is present which can be evacuated and which is independent from the actual test chamber, the required low pressure is created rapidly in the edge zone, holding the upper frame lowered on to the bottom frame in place. The pressure in the test chamber itself must at this time not yet have dropped significantly.

Further advantages and details of the present invention shall be explained with reference to the schematically depicted design examples of drawing FIGS. 1 and 2. Depicted is in
  drawing FIG. 1 a partial sectional view through an implementation with a double seal and
  drawing FIG. 2 a partial sectional view through an implementation with a protrusion affecting one of the foils.

In the drawing figures the foil leak chamber is designated as 1, its two frames as 2, 3, the therein clamped foils as 4, 5, a handle provided at the upper frame 2 as 6, bores in one of the frames 2, 3 connectable to a vacuum pump as 7, said bores preferably being located in the bottom frame 3, the actual test chamber as 8, a joint preferably provided at the bottom foil 5 said joint being connectable to a vacuum pump as 9 and[1] a test sample located in the test chamber 8 as 11.

[1] Translator's note: The German text states "udn" here whereas "und" would be appropriate. Therefore "und" has been assumed for the translation.

In the implementation in accordance with drawing FIG. 1 the frames 2, 3 are equipped with a double seal. It comprises two concentric sealing rings 12, 13 and the intermediate space 14. Bores 7 open out into this intermediate space so that it forms the edge zone which can be evacuated.

Connected to the bores 7 and the connection 9 are one each vacuum pump 15, 16. After lowering the upper frame 2 on to the bottom frame 3, the evacuation process commences. Owing to the very small volume of the intermediate space 14, a low pressure is attained in said intermediate space very quickly, holding the upper frame 2 in place.

Figure 2:
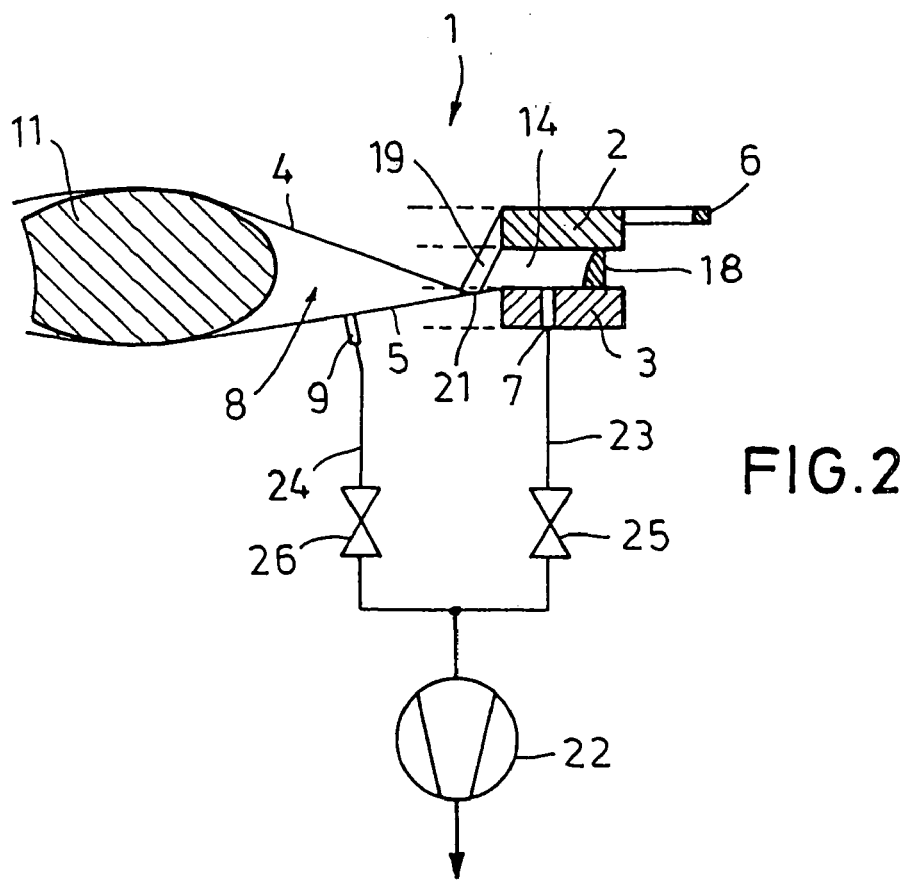

In the design example in accordance with drawing FIG. 2, only one sealing ring 18 is located between the frame 2, 3. In addition, the upper frame 2 is equipped with a circumferential protrusion 19 shaping the foil 4 clamped in the upper frame 2 in the direction of the bottom frame 3. The free circumferential rim 21 of the protrusion 19 is so positioned that the foils 4, 5 touch each other with upper frame 2 in the lowered state. Thus the desired evacuable edge zone 14 is created between the sealing lip 18 and the line of contact of the foils 4, 5.

In the implementation in accordance with drawing FIG. 2, only one vacuum pump 22 is provided. Its inlet is linked via the two lines 23, 24 to the bores 7 or the joint 9. Each of the lines 23, 24 is equipped with a valve 25, 26. Thus there exists the possibility of initially evacuating the evacuable edge zone 14 in order to generate a sufficiently low pressure in the edge zone 14. Thereafter, the test chamber 8 is evacuated.

A substantial advantage of the solution in accordance with drawing FIG. 2 is, that the frame 2 or 3 of an already finished foil leak chamber 1 can be retrofitted with the protrusion 19. In the instance of new foil leak chambers 1, the protrusion 19 is preferably provided by means of a contoured unitary component joined to one of the frames 2, 3.

What is claimed is:

1. A foil leak detection chamber comprising two frames connected together in an articulated manner, foils which are mounted on said frames, a test chamber composed of the foils, a seal arranged between the frames, and at least one bore hole in at least one of the two frames, said at least one bore hole adapted to be connected to an inlet of a vacuum pump, wherein an edge zone is provided in which a vacuum can be created independently of said test chamber and into which said bore hole opens out, wherein one of said frames is equipped with an inner circumferential protrusion, and wherein a circumferential rim of said protrusion is so positioned that the said two foils touch each other when said frames rest on each other.

2. The chamber according to claim 1, wherein said protrusion comprises a contoured unitary component joined to one of said frames.

3. A method for using a foil leak detection chamber having first and second frames connected in an articulated manner and foils mounted to each of the frames, said method comprising the steps of:
  (A) providing a seal system for said detection chamber, the seal system defining two independently evacuatable areas of said detection chamber, the independently evacuatable areas being (i) a test chamber, and (ii) an edge zone, wherein said providing step includes the step of providing a circumferential protrusion on one of said first and second frames, said circumferential protrusion being so positioned that said foils contact each other when said first and second frames are moved together;

(B) placing an article in said test chamber;

(C) moving said first and second frames together so that said foils touch each other;

(D) evacuating said edge zone so that a holding force between said frames is sufficient to eliminate a need to apply an outside holding force to hold said frames together; and (E) evacuating said test chamber to test for leaks in said article.

4. The method of claim 3, wherein said circumferential protrusion comprises a contoured unitary component joined to one of said frames.

5. The method of claim 3, wherein said foil leak detection chamber includes a handle provided at one of said first and second frames.

6. The method of claim 3, wherein said providing step includes the step of retrofitting said protrusion on foil leak detect chamber previously devoid of said protrusion.

7. A foil leak detection apparatus comprising:
(A) upper and bottom frames connected together in an articulated manner;
(B) a protrusion extending from said upper frame;
(C) a first foil mounted on said upper frame;
(D) a second foil mounted on said bottom frame, wherein said second foil and said first foil define a test chamber; and
(E) a bore hole formed in an at least one of said first and second frames,
(F) wherein said protrusion is so positioned that said first and second foils touch each other when said upper frame is lowered onto said bottom frame.

8. The foil leak detection apparatus of claim 7, wherein said protrusion comprises a contoured unitary component.

9. The foil leak detection apparatus of claim 7, wherein said protrusion is a circumferential protrusion.

10. The foil leak detection apparatus of claims 7, wherein said apparatus includes a handle provided at said upper frame.

11. The foil leak detection apparatus of claim 7, wherein said apparatus includes a single sealing ring between said upper and bottom frames.

* * * * *